United States Patent Office 3,455,926
Patented July 15, 1969

3,455,926
PHENAZINE DERIVATIVES
Jean Clement Louis Fouche, Bourg-la-Reine, and Claude Georges Alexandre Gueremy, Creteil, France, assignors to Rhone-Poulenc S.A., Paris, France, a French body corporate
No Drawing. Filed Mar. 18, 1966, Ser. No. 535,319
Claims priority, application France, Mar. 25, 1965, 10,709; Feb. 4, 1966, 48,520
Int. Cl. C07d 51/80; A61k 27/00
U.S. Cl. 260—267                                   6 Claims

ABSTRACT OF THE DISCLOSURE

The invention provides new substituted 2-amido-phenazine-5,10-dioxides which show anti-cancer activity, e.g. against solid tumors in mice.

---

This invention relates to new therapeutically useful phenazine derivatives, to a process for their preparation and pharmaceutical compositions containing them.

According to the present invention, there are provided the new phenazine derivatives of the formula:

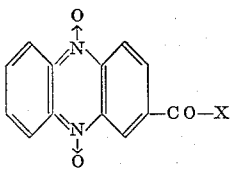

(I)

wherein X represents an amino group, or an amino group carrying one or two substituents selected from alkyl, substituted alkyl, aryl (preferably phenyl), cycloalkyl, aralkyl (preferably phenylalkyl) or cycloalkylalkyl groups, or a saturated mononuclear, nitrogen-containing heterocyclic group having 5 or 6 atoms in the ring, which may include a second hetero atom selected from oxygen, sulphur and nitrogen, and optionally carry one or more alkyl, substituted alkyl or phenylalkyl substituents, attached through a nitrogen atom to the grouping —CO—, for example 1-pyrrolidinyl, piperidino, morpholino, 1-piperazinyl and 1-piperazinyl substituted in the 4-position by an alkyl or phenylalkyl group, and when X includes a basic amino group acid addition salts or, if the basic group is tertiary, quaternary ammonium salts thereof. In this specification and accompanying claims the alkyl groups referred to contain up to 6 carbon atoms, and the term "substituted alkyl" indicates an alkyl group one or more hydrogen atoms of which are replaced by groups selected from hydroxy, alkoxy containing up to 6 carbon atoms, amino, amino carrying one or two substituents as stated above in respect of the definition of symbol X, and nitrogen-containing heterocyclic groups as hereinbefore mentioned. It will be appreciated that the definition of X includes the particular grouping

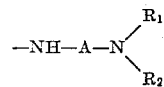

in which A represents a straight or branched aliphatic hydrocarbon chain containing 2 to 5 carbon atoms, and $R_1$ and $R_2$ represent alkyl groups or together with the nitrogen atom to which they are attached collectively represent a nitrogen-containing heterocyclic group of the type hereinbefore mentioned.

According to a feature of the present invention, the phenazine derivatives of Formula I are prepared by reacting 2-carboxyphenazine-5,10-dioxide of the formula:

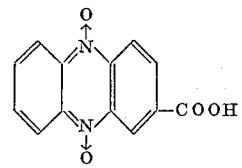

(II)

with N,N'-carbonyldiimidazole to form the intermediate imidazolide of the formula:

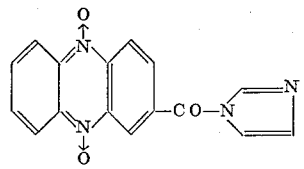

(III)

viz 2-(1-imidazolyl)carbonylphenazine - 5,10 - dioxide, and reacting the imidazolide with an amine H—X, wherein X is as hereinbefore defined.

The reaction conditions are those usually employed for the preparation of amides from acids by this method. Generally, the reactions are effected at or about ambient temperature, e.g. 10°–30° C., using an organic solvent which is inert under the operating conditions employed, for example tetrahydrofuran or dimethylformamide.

2-carboxyphenazine-5,10-dioxide employed as starting material is described by Maffei et coll, Ann. chim: (Roma), 42, 519–525 (1952).

The phenazine derivatives of Formula I which include a basic amino group may be converted by methods known per se into acid addition salts and, when the basic group is tertiary, quaternary ammonium salts. The acid addition salts may be obtained by the action of acids on the phenazine derivatives in appropriate solvents. As organic solvents there may be used, for example, alcohols, ethers, ketones or chlorinated hydrocarbons. The acid addition salt which is formed is precipitated, if necessary after concentration of its solution, and is separated by filtration or decantation. The quaternary ammonium salts may be obtained by the action of esters on the phenazine derivatives, optionally in an organic solvent at ambient temperature or, more rapidly, with gentle heating.

In this specification the term "methods known per se" means methods heretofore used or described in the chemical literature.

The new phenazine derivatives of Formula I and non-toxic acid and quaternary ammonium salts thereof possess chemotherapeutic properties; in particular, they have proved to be active as anticancer agents when tested against solid tumors in mice, i.e. sarcoma 180, benzopyrene sarcoma and mammary adenocarcinoma R III, when administered subcutaneously at doses of 25 to 100 mg./kg. per day. The most interesting products in this respect are those of the formula:

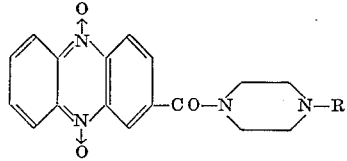

(IV)

wherein R represents an alkyl group, e.g. 2-(4-methyl-1 piperazinyl)-carbonylphenazine-5,10-dioxide and 2-(4-ethyl-piperazinyl)-carbonylphenazine-5,10-dioxide, especially the former. Other compounds of importance are those in which X represents a group

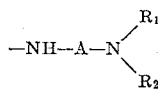

wherein A, $R_1$ and $R_2$ are as hereinbefore defined, or a 4-phenylalkyl-1-piperazinyl group.

For therapeutic purposes, the phenazine derivatives of Formula I are employed as such or, when appropriate, in the form of non-toxic acid addition salts, i.e. salts containing anion which are relatively innocuous to the animal organism in therapeutic doses of the salts (such as hydrochlorides and other hydrohalides, phosphates, nitrates, sulphates, acetates, propionates, succinates, benzoates, fumarates, maleates, theophyllinacetates, salicylates, phenolphthalinates and methylene-bis-β-hydroxynaphthoates) so that the beneficial physiological properties inherent in the bases are not vitiated by side-effects ascribable to the anions. They may also be employed, when appropriate, in the form of non-toxic quaternary ammonium salts obtained by reaction with organic halides (e.g. methyl, ethyl, allyl or benzyl chloride, bromide or iodide) or other reactive esters, e.g. methyl- or ethyl-sulphates, benzenesulphonates or toluene-p-sulphonates.

The following examples, in which the temperatures are in degrees centigrade, illustrate the invention.

EXAMPLE I 2-carboxyphenazine-5,10-dioxide (12.0 g.) is added to a solution of N,N'-carbonyldiimidazole (88%; 17.2 g.) in anhydrous dimethylformamide (500 cc.). The acid starting material gradually dissolves, and the intermediate 2-(1-imidazolyl)carbonylphenazine-5,10-dioxide then crystallizes. After 24 hours reaction at ambient temperature, 1-methylpiperazine (21 g.) is poured into the suspension obtained. The intermediate imidazolide dissolves and then the final product crystallzes out. After 4 hours at ambient temperature and 1 hour at 5°, the crystals are filtered off, washed with dimethylformamide (15 cc.) followed by ethanol (12 cc.), and dried under reduced pressure (2 cm. of mercury). There is thus obtained 2-(4-methyl-1-piperazinyl)-carbonylphenazine-5,10-dioxide (10.1 g.) melting at 210°.

The filtrate is evaporated under reduced pressure (2 cm. of mercury) and the residue then taken up in ethanol (25 cc.), filtered, washed and dried to give 2-(4-methyl-1-piperazinyl)carbonylphenazine-5,10-dioxide (3.9 g.) melting at 208°.

The two fractions of product are combined and recrystallised from boiling propanol (245 cc.). After 2 hours cooling at 5°, the crystals are filtered off, washed twice and ethanol (total 50 cc.) and dried under reduced pressure (2 cm. of mercury) to give 2-(4-methyl-1-piperazinyl)carbonylphenazine-5,10-dioxide (11.4 g.) melting at 209–210°.

The 2-carboxyphenazine-5,10-dioxide, which melts at about 270°, can be prepared according to the method of Maffei et coll., Ann. chim. (Roma), 42, 519–525 (1952).

EXAMPLE II 2-carboxyphenazine-5,10-dioxide (5.12 g.) is added to a solution of N,N'-carbonyldiimidazole (88%; 7.3 g.) in anhydrous dimethylformamide (250 cc.). The acid starting material gradually dissolves and the intermediate 2-(1-imidazolyl)carbonylphenazine-5,10 - dioxide crystallizes. After 17 hours reaction at ambient temperature, 2-dimethylaminoethylamine (7.1 g.) is poured into the suspension obtained. After 7 hours at ambient temperature, the reaction mixture is concentrated under reduced pressure (2 cm. of mercury), and then the residue is recrystallised from boiling ethanol (25 cc.). After 4 hours cooling at 5°, the crystals are filtered off, washed three times with ethanol (total 50 cc.), then washed four times with diethyl ether (total 40 cc.), and dried under reduced pressure (2 cm. of mercury) to give 2-(2-dimethylaminoethyl)aminocarbonylphenazine-5,10-dioxide (5.1 g.) melting at 180°.

EXAMPLE III

The procedure of Example II is carried out but using N,N'-carbonyldiimidazole (91.9%; 15.0 g.), anhydrous dimethylformamide (240 cc.), 2-carboxyphenazine-5,10 dioxide (10.9 g.) and 1-ethylpiperazine (19.4 g.). The intermediate imidazolide dissolves and then the final product crystallizes out. After 2 hours at ambient temperature and 4 hours at 5°, the crystals are filtered off, washed with dimethylformamide (5 cc.) followed by ethanol (15 cc.), and dried under reduced pressure (2 cm. of mercury) to give 2-(4-ethyl-1-piperazinyl)carbonylphenazine - 5,10-dioxide (7.4 g.) melting at 160–162°.

The filtrate is evaporated under reduced pressure (2 cm. of mercury) and then the residue taken up in ethanol (100 cc.). After 4 hours at 5°, the crystals formed are filtered off, washed and dried to yield 2-(4-ethyl-1-piperazinyl) carbonylphenazine-5,10-dioxide (4.8 g.).

The two fractions of product are combined and recrystallised from boiling ethanol (200 cc.). After 15 hours at 5°, the crystals are filtered off, washed three times with ethanol (total 30 cc.), and dried under reduced pressure (2 cm. of mercury) to give 2-(4-ethyl-1-piperazinyl) carbonylphenazine-5,10-dioxide (9.6 g.) melting at 160–162°.

EXAMPLE IV 3-dimethylamino-2-methylpropylamine (19.8 g.) is added to a suspension of 2-(1-imidazolyl)carbonylphenazine-5,10-dioxide obtained as described in Example III, starting with the same amounts of reagents. The intermediate imidazolide dissolves. After 2 hours at ambient temperature and 5 hours at 5°, the reaction mixture is concentrated under reduced pressure (2 cm. of mercury) and the residue is then taken up in ethanol (200 cc.). After 15 hours at 5°, the crystals are filtered off and dried to give 2-(3-dimethylamino-2-methylpropyl)aminocarbonylphenazine-5,10-dioxide (13.4 g.) melting at 164–166°. The product is recrystallised from boiling ethanol (180 cc.). After 4 hours at 5°, the crystals are filtered off, washed three times with ethanol (total 25 cc.) and dried under reduced pressure (2 cm. of mercury) to give 2 - (3 - dimethylamino - 2 - methylpropyl)aminocarbonylphenazine-5,10-dioxide (12.4 g.) melting at 164–166°.

EXAMPLE V 1-benzylpiperazine (30.0 g.) is added to a suspension of 2 - (1 - imidazolyl)carbonylphenazine - 5,10 - dioxide obtained as described in Example III, starting with the same amounts of reagents. The intermediate imidazolide dissolves. After 2 hours at ambient temperature and 6 hours at 5°, the reaction mixture is concentrated under reduced pressure (2 cm. of mercury) and then the residue is taken up in chloroform (250 cc.). The solution obtained is washed with distilled water (100 cc.), twice with sodium hydroxide (0.2 N; total 200 cc.), and finally three times with distilled water (total 300 cc.). After drying the solution over magnesium sulphate, the solvent is evaporated and the residue is taken up in ethanol (75 cc.). After 15 hours at 5°, the crystals formed are filtered off, washed and dried to yield a product (8.4 g.) melting at 160–162°. The product is recrystallised from boiling ethanol (250 cc.). After 4 hours at 5°, the crystals are filtered off, washed three times with ethanol (total 30 cc.), and dried under reduced pressure (2 cm. of mercury) to give 2-(4-benzyl-1-piperazinyl)carbonylphenazine-5,10-dioxide (7.6 g.) melting at 162°.

EXAMPLE VI 2-(1-pyrrolidinyl)ethylamine (19.4 g.) is added to a suspension of 2 - (1-imidazolyl)carbonylphenazine-5,10-dioxide obtained as described in Example III, starting with the same amounts of reagents. The intermediate imidazolide dissolves and the final product then crystallizes out. After 2 hours at ambient temperature and 4 hours at 5°, the crystals are filtered off, washed with dimethylformamide (8 cc.) and then three times with ethanol (total 30 cc.), and dried under reduced pressure (2 cm. of mercury) to yield 2 - [2 - (1-pyrrolidinyl)-ethyl] aminocarbonylphenazine-5,10-dioxide (11.5 g.).

The filtrate is evaporated under reduced pressure (2 cm. of mercury) and then the residue is taken up in ethanol (100 cc.). After 2 hours at 5°, the crystals formed are filtered off, washed and dried to yield 2-[2-(1-pyrrolidinyl) ethyl]aminocarbonylphenazine-5,10-dioxide (3.0 g.).

The two fractions of product are combined and recrystallised from boiling ethanol (600 cc.). After 4 hours at 5°, the crystals are filtered off, washed three times with ethanol (total 30 cc.) and dried under reduced pressure (2 cm. of mercury) to give 2-[2 - (1 - pyrrolidinyl)-ethyl] aminocarbonylphenazine-5,10-dioxide (12.5 g.) melting at 184–186°.

EXAMPLE VII 3-dimethylaminopropylamine (17.2 g.) is added to a suspension of 2-(1-imidazolyl)carbonylphenazine-5,10-dioxide obtained as described in Example III, starting with the same amounts of reagents. The intermediate imidazolide dissolves. After 2 hours at ambient temperature and 5 hours at 5°, the reaction mixture is concentrated under reduced pressure (2 cm. of mercury) and then the residue taken up in ethanol (150 cc.). After 15 hours at 5°, the crystals formed are filtered off, washed and dried to yield 2 - (3 - dimethylaminopropyl)aminocarbonylphenazine-5,10-dioxide (9.5 g.). The product is recrystallised from boiling methanol (90 cc.) After 60 hours at 5°, the crystals are filtered off, washed three times with methanol (total 15 cc.) and dried under reduced pressure (2 cm. of mercury) to give 2-(3-dimethylaminopropyl)-aminocarbonylphenazine-5,10-dioxide, (8.6 g.) melting at 161–163°.

EXAMPLE VIII 2-(4-methyl-1-piperazinyl)ethylamine (24.3 g.) is added to a suspension of 2-(1-imidazolyl)carbonylphenazine-5, 10-dioxide obtained as described in Example III, starting with the same amounts of reagents. The intermediate imidazolide dissolves and then the final product crystallizes out very slowly. After 2 hours at ambient temperature and 20 hours at 50, the crystals formed are filtered off, washed with dimethylformamide (8 cc.), and then three times with ethanol (total 25 cc.) and dried under reduced pressure (2 cm. of mermury to give 2-[2-(4-methyl-1-piperazinyl)ethyl]aminocarbonylphenazine - 5,10 - dioxide (11.0 g.).

The filtrate is evaporated under reduced pressure (2 cm. of mercury) and the residue then taken up in ethanol (50 cc.). After 3 hours at 5°, the crystals formed are filtered off, washed and dried to yield 2-[2-(4-methyl-1-piperazinyl]aminocarbonylphenazine - 5,10 - dioxide (4.0 g.).

The two fractions of product are combined and recrystallized from boiling ethanol (130 cc.). After 15 hours at 5°, the crystals are filtered off, washed three times with ethanol (total 30 cc.) and dried under reduced pressure (2 cm. of mercury) to yield 2-[2-(4-methyl-1-piperazinyl) ethyl]aminocarbonylphenazine-5,10 - dioxide (11.5 g.) melting at 170–172°.

The present invention includes within its cope pharmaceutical compositions which comprise at least one of the phenazine derivatives of Formula I, or non-toxic acid addition or quaternary ammonium salt thereof, in association with a pharmaceutically-acceptable carrier "or coating."

Preparations according to the invention for parenteral administration, include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. The dosage will depend upon the therapeutic effect sought, the route of administration and the duration of treatment.

We claim:
1. A phenazine derivative of the formula:

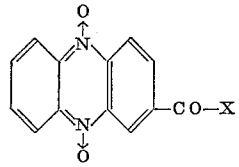

wherein X represents

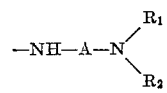

in which A represents alkylene of 2 through 5 carbon atoms and $R_1$ and $R_2$, when taken singly, represent alkyl of 1 to 6 carbon atoms or, when taken together with the nitrogen atom to which they are attached, represent 1-pyrrolidinyl, 4-alkyl-piperazinyl in which the alkyl contains up to 6 carbon atoms, or 4-benzyl-piperazinyl or X represents 4-alkyl-piperazinyl in which the alkyl contains up to 6 carbon atoms, or 4-benzyl-piperazinyl.

2. 2 - (4-methyl-1-piperazinyl)-carbonylphenazine-5,10-dioxide.

3. 2 - (4 - ethyl-1-piperazinyl)-carbonylphenazine-5,10-dioxide.

4. 2 - (3-dimethylamino-2-methylpropyl)amino-carbonylphenazine-5,10-dioxide.

5. 2-[2-(1-pyrrolidinyl)ethyl]aminocarbonylphenazine-5,10-dioxide.

6. 2 - [2-(4-methyl-1-piperazinyl)ethyl]aminocarbonyl-phenazine-5,10-dioxide.

References Cited

UNITED STATES PATENTS 3,080,283   3/1963   Bijloo et al. _____ 260—267

ALEX MAZEL, Primary Examiner

A. M. TIGHE, Assistant Examiner

U.S. Cl. X.R.

260—247.2; 424—248, 250